US008484842B2

(12) United States Patent
Dickerson et al.

(10) Patent No.: US 8,484,842 B2
(45) Date of Patent: Jul. 16, 2013

(54) APPARATUS FOR SEPARATING ENGINE CRANKCASE PORTIONS AND METHOD FOR SAME

(75) Inventors: Kent Alan Dickerson, Royal Oak, MI (US); Robin Lee Carver, Waterford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 233 days.

(21) Appl. No.: 13/099,411

(22) Filed: May 3, 2011

(65) Prior Publication Data

US 2012/0279036 A1 Nov. 8, 2012

(51) Int. Cl.
*B23P 19/04* (2006.01)

(52) U.S. Cl.
USPC ........................ 29/888.011; 29/239; 29/426.5

(58) Field of Classification Search
USPC .................................. 29/239, 426.5, 888.011
See application file for complete search history.

(56) References Cited

U.S. PATENT DOCUMENTS 4,057,889 A * 11/1977 Ferguson ..................... 29/426.5
4,176,439 A * 12/1979 Jarmann ...................... 29/426.5

* cited by examiner

*Primary Examiner* — Alexander P Taousakis
(74) *Attorney, Agent, or Firm* — Quinn Law Group, PLLC

(57) ABSTRACT

An apparatus includes a plate configured for connection to a first engine crankcase portion, such as the lower crankcase. A cam mechanism is secured to the plate and has a portion spaced from the plate to define a gap between the portion of the cam mechanism and the plate. Studs are configured for connection to the second engine crankcase portion and configured to span the gap when connected to the second engine crankcase portion so that the cam mechanism rests on the studs when the plate is connected to the first engine crankcase portion. The cam mechanism is configured to lift the plate when force is applied to the cam mechanism. A method of separating crankcase portions is carried out using the apparatus.

7 Claims, 4 Drawing Sheets

APPARATUS FOR SEPARATING ENGINE CRANKCASE PORTIONS AND METHOD FOR SAME

TECHNICAL FIELD

The invention relates to an apparatus for separating engine crankcase portions and a method for separating engine crankcase portions.

BACKGROUND

Engine crankcases, sometimes referred to as engine blocks, are often designed with portions that are separately cast or otherwise formed, and then bolted or otherwise connected together during assembly of the engine, such as with a bedplate or ladder frame construction. For example, the upper case or engine block is cast with cylinder bores and a portion of the crankshaft opening, and a lower case is cast or formed to carry bearing caps for the crankshaft. During assembly, the crankcase portions are first aligned with one another using dowels, and then connected to one another, typically with bolts.

During engine assembly, after the crankcase portions are aligned or connected to one another, they are typically separated to allow bearing installation between the crankcase portions and the crankshaft. Additionally, separation of the engine crankcase portions may be desired, such as during testing and analysis of engines by the manufacturer, to allow the installation of aftermarket components, or during servicing. In such instances, the crankcase portions are typically separated by inserting a pry bar at various pry points and beating on the pry bar with a mallet. This can lead to surface damage of the crankcase portions at the pry points and potentially distort the crankcase portions. Furthermore, the beating force is applied at individual pry points in succession around the perimeter of the crankcase portions. This may lead to distortion and damage to the dowels, and the inability to properly align the crankcase portions for reconnection after the separation.

SUMMARY

An apparatus enables a method of separating crankcase portions without distortion or damage to the crankcase portions. The apparatus includes a plate configured for connection to a first engine crankcase portion, such as the lower crankcase. A cam mechanism is secured to the plate and has a portion spaced from the plate to define a gap between the portion of the cam mechanism and the plate. Studs are configured for connection to the second engine crankcase portion and configured to span the gap when connected to the second engine crankcase portion so that the cam mechanism rests on the studs when the plate is connected to the first engine crankcase portion. The cam mechanism is configured to move the plate when force is applied to the cam mechanism. The force may be manually applied, or may be via a pneumatic, hydraulic, or other type of actuator. When the plate is connected to the first engine crankcase portion and the studs are connected to the second engine crankcase portion, the movement of the plate will separate the crankcase portions from one another.

In one embodiment, the cam mechanism may have a rotatable member, an elongated member with at least one ramped surface, and at least one wedge member. The rotatable member interferes with the elongated member so that the elongated member moves linearly relative to the at least one wedge member when the rotatable member is rotated. The wedge member interferes with the ramped surface as the elongated member moves so that the elongated member is wedged against the wedge member to raise the plate.

In another embodiment, the cam mechanism may have a rotatable member and an elongated member with an opening extending therethrough. The cam mechanism may also have a ramp member that is secured to the plate and has a slot extending through the ramp member at an angle with respect to the plate. A pin may be secured to the elongated member. The pin may extend through the elongated member to traverse the opening and extend through the ramp member at the slot. The rotatable member may interfere with the elongated member so that the elongated member moves linearly relative to the ramp member when the rotatable member is rotated. The pin may interfere with the ramp member at the slot as the elongated member moves so that the ramp member, the plate, and the first engine crankcase member are separated from the second engine crankcase member as the elongated member moves.

A method of separating a first engine crankcase portion from a second engine crankcase portion includes removing a first set of fasteners that connect the first engine crankcase portion and the second engine crankcase portion and extend through aligned openings in the first engine crankcase portion and the second engine crankcase portion. The method further includes installing a second set of fasteners in the aligned openings so that the second set of fasteners is secured to the second engine crankcase portion and pass through the first engine crankcase portion at the aligned openings. Next, the apparatus includes securing an apparatus to the first engine crankcase portion so that the apparatus rests on the second set of fasteners. The apparatus has a cam mechanism that converts a rotational force into a linear force on the first engine crankcase portion. The cam mechanism is operated by applying the rotational force to thereby cause the first engine crankcase portion to separate from the second engine crankcase portion.

The above features and advantages and other features and advantages of the present invention are readily apparent from the following detailed description of the best modes for carrying out the invention when taken in connection with the accompanying drawings.

DETAILED DESCRIPTION

Figure 1:
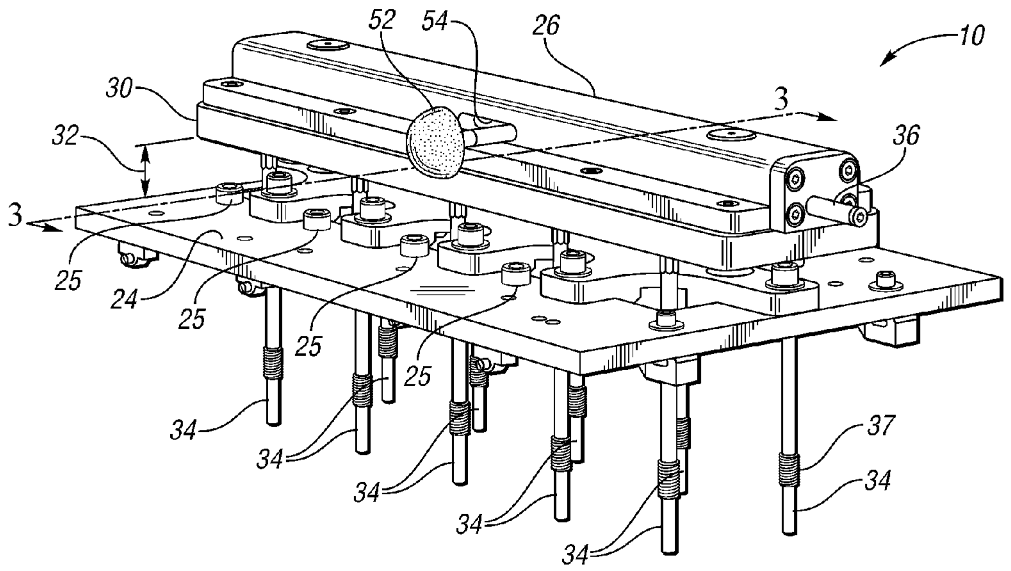
FIG. 1 is a schematic perspective illustration of a first embodiment of an apparatus for separating engine crankcase portions.
Figure 2:
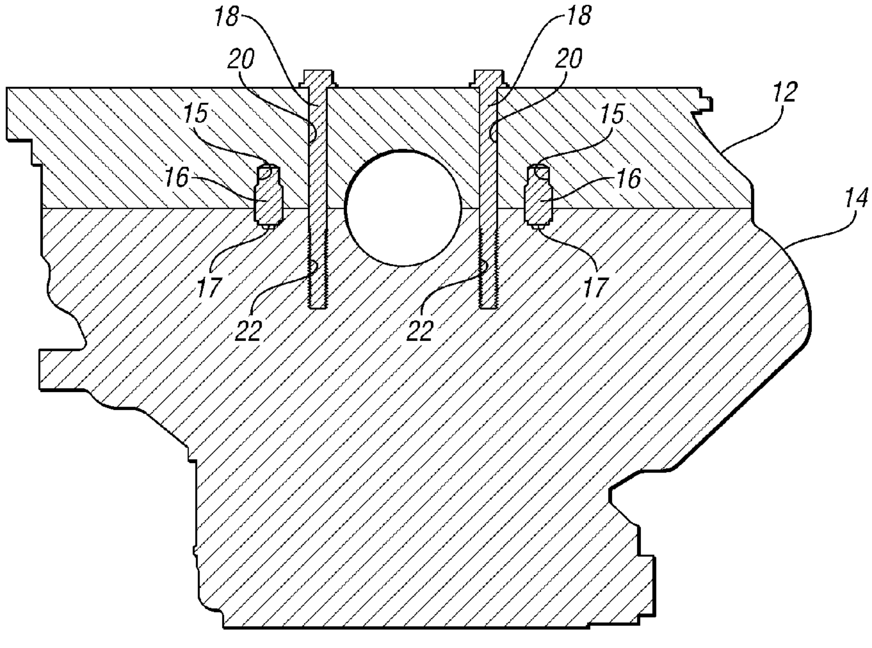
FIG. 2 is a schematic cross-sectional illustration of first and second engine crankcase portions connected to one another prior to separation by the apparatus of FIG. 1.

Referring to the drawings, wherein like reference numbers refer to like components throughout the several views, FIG. 1 shows an apparatus 10 for separating upper and lower engine crankcase portions. FIG. 2 shows the lower crankcase portion, referred to herein as the first engine crankcase portion 12, secured to the upper crankcase portion, referred to herein as the second engine crankcase portion 14. In a typical assembly process of an engine, the engine crankcase portions 12, 14 are first aligned with one another using dowels 16 placed in aligned cavities 15, 17 of the crankcase portions 12, 14, and then are secured to one another with a first set of fasteners 18. In FIG. 2, the fasteners 18 are shown as bolts with ends threaded to the second engine crankcase portion 14. The fasteners 18 secure the engine crankcase portions to one another by extending through openings 20 in the first engine crankcase portion 12 that align with openings 22 in the second engine crankcase portion 14. The apparatus 10 allows removal of the first engine crankcase portion 12 from the second engine crankcase portion 14 without the risk of deformation of the crankcase portions 12, 14. The crankcase portions 12, 14 separate from one another evenly with all contact surfaces separating at once. Dowels 16 used to align the engine crankcase portions 12, 14 are thus not deformed or damaged.

Figure 3:
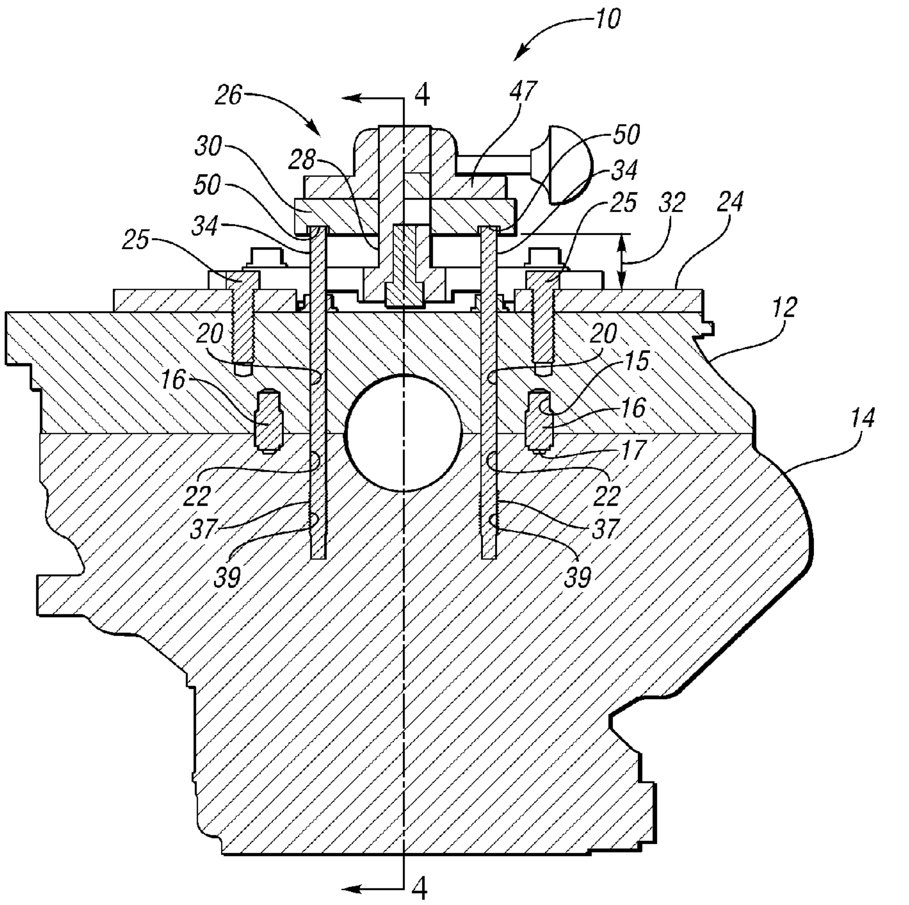
FIG. 3 is a schematic cross-sectional illustration of the apparatus of FIGS. 1 and 2 taken at the lines 3-3 in FIG. 1 with the apparatus shown connected to the engine crankcase portions.

Referring again to FIG. 1, the apparatus 10 includes a plate 24 configured for connection to the first engine crankcase portion 12 with bolts 25, as shown in FIG. 3. The apparatus 10 includes a cam mechanism 26 secured to the plate 24 by posts 28 shown in FIG. 3. The cam mechanism 26 has a portion 30 that is spaced from the plate 24 to define a gap 32 between the portion 30 of the cam mechanism 26 and the plate 24, as shown in FIG. 1.

The apparatus 10 includes multiple studs 34 that are configured to connect to the second engine crankcase portion 14. In this embodiment, the studs 34 are bolts that have a threaded portion 37 that fits to threads 39 in the openings 22 of the second engine crankcase portion 14, as shown in FIG. 3. Thus, the studs 34 extend through the aligned openings 20, 22 in place of the fasteners 18 after the fasteners 18 are removed. However, the studs 34 are configured to span the gap 32 when connected to the second engine crankcase portion 14 so that the cam mechanism 26 rests on the studs 34 when the plate 24 is connected to the first engine crankcase portion 12. The studs 34 simply pass through the openings 20 in the first engine crankcase portion 12 without interfering or connecting with the first engine crankcase portion 12.

The cam mechanism 26 is configured to convert a rotational force into a linear force that lifts the plate 24 to separate the first engine crankcase portion 12 from the second engine crankcase portion 14 when the rotational force is applied to the cam mechanism 26. Specifically, referring to FIG. 4, the cam mechanism 26 has a rotatable member 36 that can rotate about a longitudinal axis 38 as indicated by arrow 40. In this embodiment, the rotatable member 36 is a set screw. The cam mechanism 26 also has an elongated member 42 with at least one ramped surface 44. In this embodiment, the elongated member 42 has two ramped surfaces 44. The cam mechanism 26 has at least one wedge member 46 secured to a housing 47 of the cam mechanism 26 in which the elongated member 42 translates. In this embodiment, there are two wedge members 46. When the rotatable member 36 is rotated, it interferes with the elongated member 42 by pushing on the elongated member 42 so that the elongated member 42 moves linearly relative to the wedge members 46.

Figure 4:
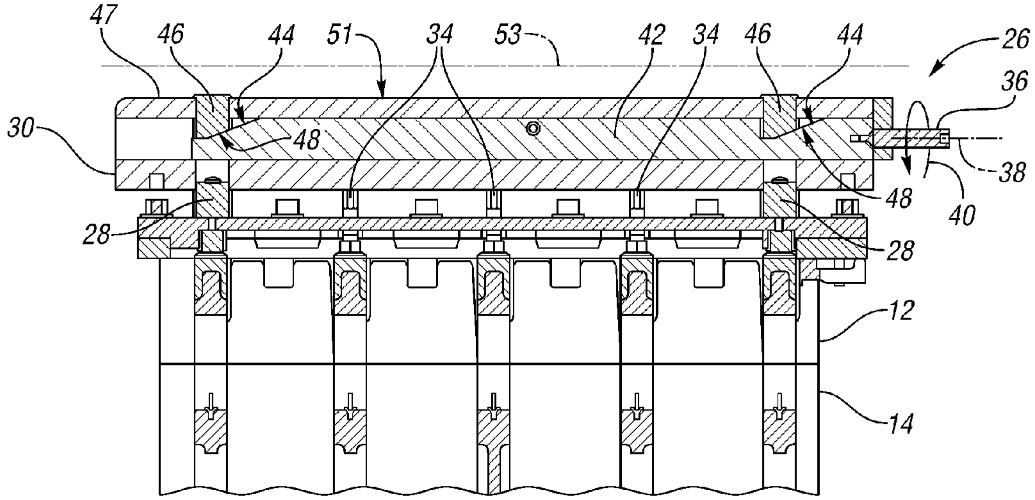
FIG. 4 is a schematic cross-sectional illustration of the apparatus connected to the engine crankcase portions of FIG. 3, taken at the lines 4-4 of FIG. 3.

As the elongated member 42 moves to the left in FIG. 4 due to rotation of the rotatable member 36, the wedge members 46 interfere with the ramped surfaces 44. The wedge members 46 each have an angled surface 48 that fits in a complementary manner with a corresponding ramped surface 44. As the elongated member 42 moves, it wedges against the wedge members 46 to raise the plate 24 and the attached first engine crankcase portion 12. In other embodiments, a pneumatic actuator, a hydraulic actuator, or another type of actuator may be used to move the elongated member instead of manual actuation with a set screw.

Referring to FIG. 3, the portion 30 of the cam mechanism 26 has recesses 50 that align with the studs 34. The portion 30 rests on the studs 34, with each of the studs 34 in a corresponding recess 50. When the elongated member 42 is moved linearly, and interferes with the wedge members 46 at the ramped surfaces 44, the portion 30 of the cam housing mechanism 26 places downward forces on the studs 34. Reaction forces of the studs 34 and forces of the elongated member 42 at the ramped surfaces 44 cause the cam housing 47 with attached posts 28, plate member 24 and first engine crankcase portion 12 to lift relative to the second engine crankcase portion 14 until a top surface 51 of the cam housing 47 moves to a position 53 indicted in FIG. 4, so that the first engine crankcase portion 12 is completely above the dowels 16, separating the two crankcase portions 12, 14 without damage to the surfaces of the crankcase portions 12, 14 and without distortion of the dowels 16.

After the apparatus 10 is used to separate the engine crankcase portions 12, 14, the plate 24 may be unbolted from the first engine crankcase portion 12 and the studs 34 removed. Testing or modifications to the engine crankcase portions 12, 14 may then be conducted. Referring to FIG. 1, to reset the apparatus 10 for subsequent use, the rotatable member 36 is rotated in an opposite direction than arrow 40 of FIG. 4 and a knob 52 extending from the elongated member 42 through a slot 54 in the housing 47 is moved to return the elongated member 42 to the initial position shown in FIG. 4.

Figure 5:
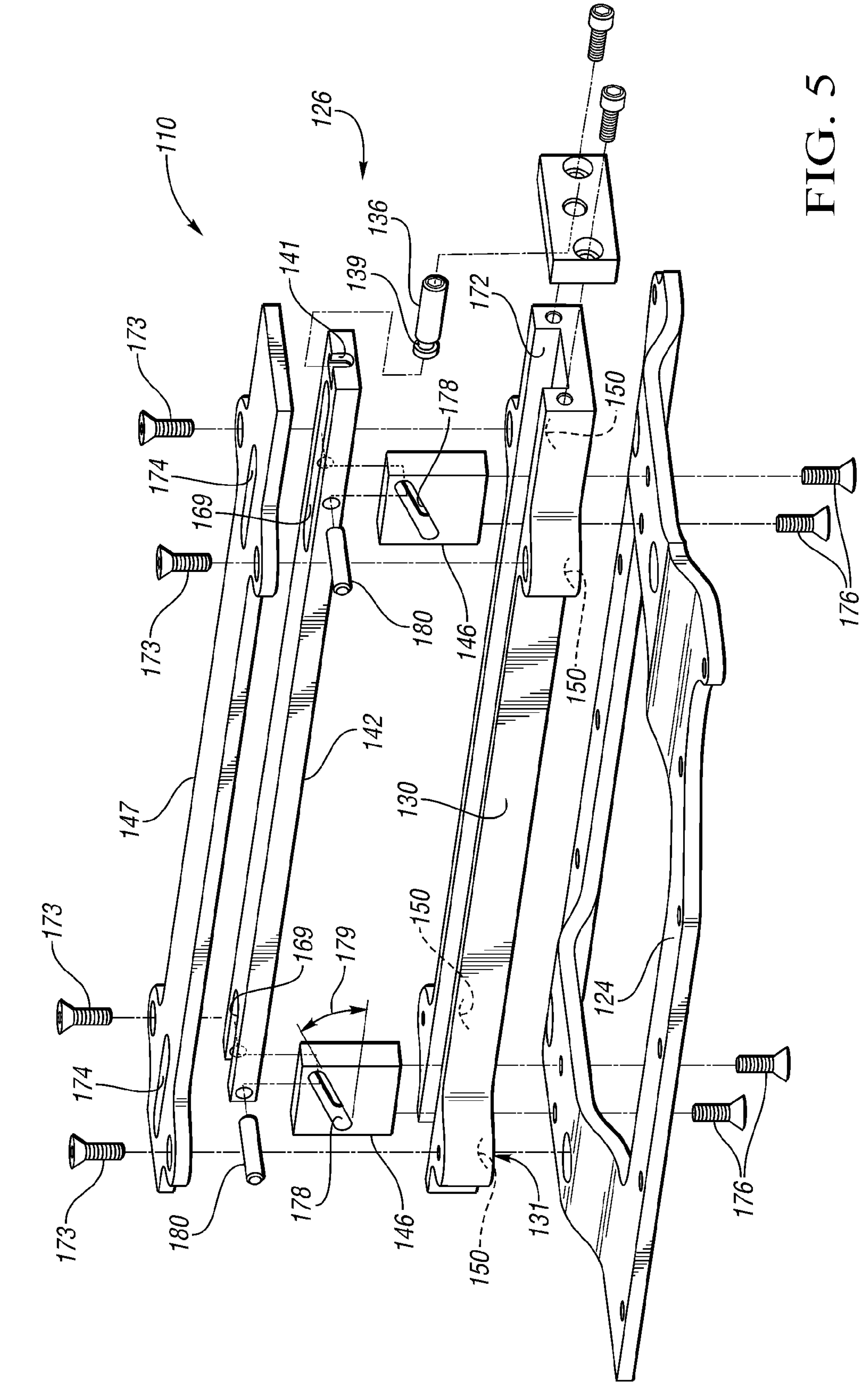
FIG. 5 is a schematic perspective illustration in exploded view of a second embodiment of an apparatus for separating engine crankcase portions.
Figure 6:
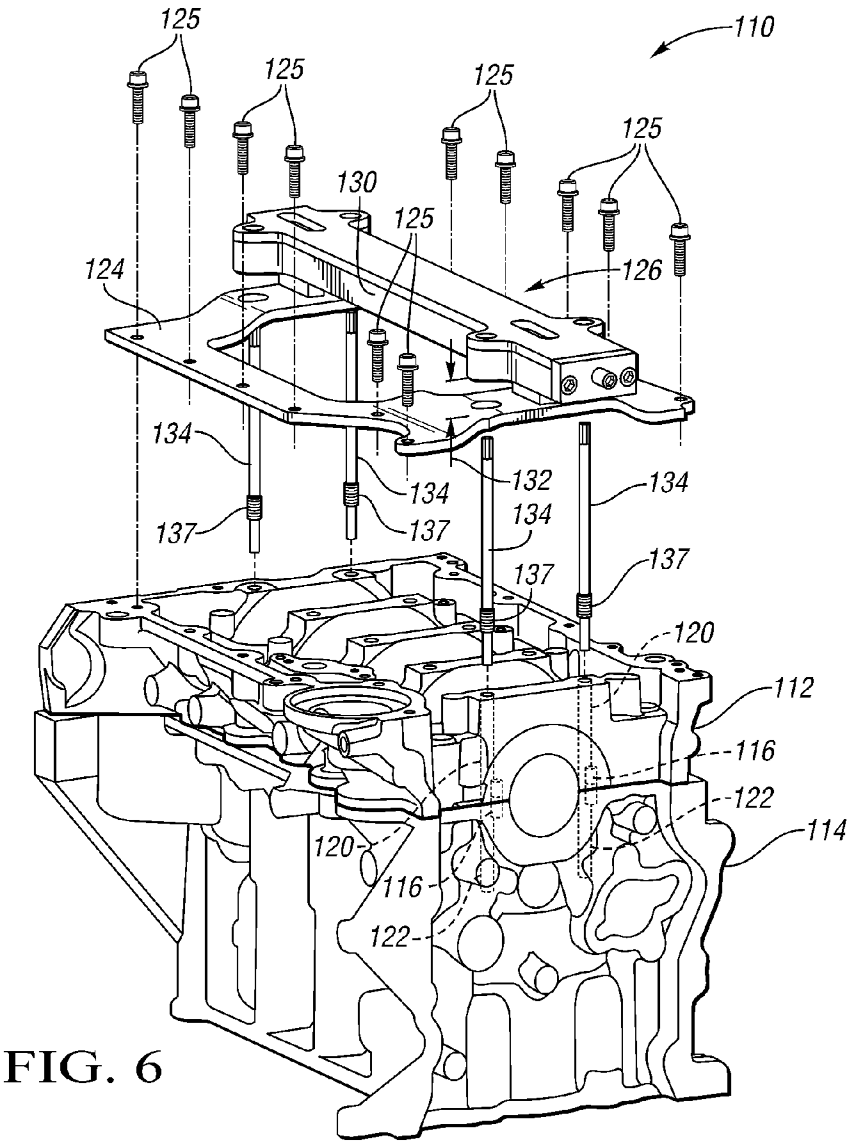
FIG. 6 is a schematic perspective illustration of the apparatus of FIG. 5, with the apparatus in exploded view connected to an engine crankcase having first and second engine crankcase portions.

FIGS. 5 and 6 show a second embodiment of an apparatus 110 operable to separate first and second engine crankcase portions 112, 114 shown in FIG. 6. The apparatus 110 is relatively light and easy to use. The apparatus 110 includes a plate 124 that connects to the first engine crankcase portion 112 with bolts 125. A cam mechanism 126 is secured to the plate 124 as described below. The cam mechanism 126 has a portion 130 spaced from the plate 124 to define a gap 132 between the portion 130 of the cam mechanism 126 and the plate 124.

As shown in FIG. 6, a bottom surface 131 of the portion 130 has recesses 150. The apparatus 110 includes studs 134 that are configured for connection to the second engine crankcase portion 114 and to span the gap 132 when connected to the second engine crankcase portion 114. The cam mechanism 126 rests on the studs 134 with the studs 134 in the recesses 150 when the plate 124 is connected to the first engine crankcase portion 112. In this embodiment, the studs 134 are bolts that have a threaded portion 137 that fits to threads in openings 122 of the second engine crankcase portion 114. Two openings 122 are shown with hidden lines in FIG. 6. The openings 122 align with openings 120 in the first engine crankshaft portion 112. There are four sets of aligned openings 120, 122 to accommodate the four studs 134.

Thus, the studs 134 extend through the aligned openings 120, 122 in place of the fasteners similar to fasteners 18 of FIG. 2 after the fasteners are removed. Two dowels 116 are shown with hidden lines and function similar to dowels 16 of FIG. 3. However, the studs 134 are configured to span the gap 132 when connected to the second engine crankcase portion 114 so that the cam mechanism 126 rests on the studs 134 when the plate 124 is connected to the first engine crankcase portion 112. The studs 134 simply pass through the openings 120 in the first engine crankcase portion 112 without interfering or connecting with the first engine crankcase portion 112.

The cam mechanism 126 is configured to convert a rotational force into a linear force that lifts the plate 124 when the rotational force is applied to the cam mechanism 126. Specifically, as shown in FIG. 5, the cam mechanism 126 has a rotatable member 136 that is a set screw. The rotatable member 136 has a groove 139 that fits to an elongated member 142 at a slot 141 in the elongated member 142. The elongated member 142 has two openings 169 that extend all the way through the elongated member 142. The elongated member 142 is movable along a track 172 of the portion 130. A housing 147 is secured to the portion 130 with bolts 173. The housing 147 has openings 174 that align with the openings 169 of the elongated member 142.

The cam mechanism 126 also includes ramp members 146 that are secured to the plate 124 with bolts 176. The ramp members 146 each have a slot 178 that extends through the ramp member 146 at an angle 179 with respect to the plate 124. Pins 180 are secured to the elongated member 142 by press-fitting or otherwise to extend through the elongated member 142 and traverse the openings 169. When the pins 180 are installed, they are pushed through the slots 178 so that they extend through the ramp members 146 at the slots 178. The groove 139 inserted to the elongated member 142 at the slot 141 causes the elongated member 142 to move linearly along the track 172 when the rotatable member 136 is rotated. Because the pins 180 are secured to the elongated member 142 and extend through the ramp members 146 at the slots 178, the pins 180 and the elongated member 124 and the portion 130 with connected housing 147 do not rise or fall when moving right to left in FIG. 5. Because the pins 180 pass through the slots 178, the ramp member 146, the plate 124, and the first engine crankcase member 112 will be forced to rise relative to the second engine crankcase member 114 as the elongated member 142 is moved from right to left in FIG. 5.

Figure 7:
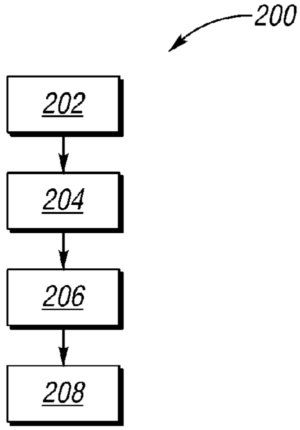
FIG. 7 is a flow diagram of a method of separating engine crankcase portions.

Referring to FIG. 7, a method 200 of separating the first engine crankcase portion 12 from the second engine crankcase portion 14 is shown as a flow diagram. The method 200 includes block 202, removing the first set of fasteners 18 that connect the first engine crankcase portion 12 and the second engine crankcase portion 14 and extend through aligned openings 20, 22 in the first engine crankcase portion 12 and the second engine crankcase portion 14. Next, the method 200 includes block 204, installing a second set of fasteners, the studs 34, in the aligned openings 20, 22 so that the second set of fasteners 34 are secured to the second engine crankcase portion 14 and pass through the first engine crankcase portion 12 at the aligned openings 20, 22. The apparatus 10 is secured to the first engine crankcase portion 12 in block 206 so that the apparatus 10 rests on the studs 34. The method 200 then includes operating the cam mechanism 26 in block 208 by applying the rotational force at the rotatable member 36 to thereby cause the first engine crankcase portion 12 to separate from the second engine crankcase portion 14 as described above.

The apparatus 110 can also be used according to the method 200 of FIG. 7 to separate the engine crankcase portions 112, 114. In block 202, a first set of fasteners similar to fasteners 18 would be removed from the aligned openings 120, 122. In block 204, a second set of fasteners, the studs 134, are inserted in the aligned openings 120, 122 so that the second set of fasteners 134 are secured to the second engine crankcase portion 114 and pass through the first engine crankcase portion 112 at the aligned openings 120, 122. The apparatus 110 is secured to the first engine crankcase portion 112 in block 206 so that the apparatus 110 rests on the studs 134. The apparatus 110 is secured to the plate 124 which is bolted to the first engine crankcase portion 112. The method 200 then includes operating the cam mechanism 126 in block 208 by applying the rotational force at the rotatable member 136 to thereby cause the first engine crankcase portion 112 to separate from the second engine crankcase portion 114 as described above.

While the best modes for carrying out the invention have been described in detail, those familiar with the art to which this invention relates will recognize various alternative designs and embodiments for practicing the invention within the scope of the appended claims.

The invention claimed is:

1. An apparatus for separating a first engine crankcase portion from a second engine crankcase portion comprising:

a plate configured for connection to the first engine crankcase portion;

a cam mechanism secured to the plate and having a portion spaced from the plate to define a gap between the portion of the cam mechanism and the plate;

studs configured for connection to the second engine crankcase portion and configured to span the gap when connected to the second engine crankcase portion so that the cam mechanism rests on the studs when the plate is connected to the first engine crankcase portion; and wherein the cam mechanism is configured to move the plate when force is applied to the cam mechanism.

2. The apparatus of claim 1, wherein the cam mechanism has:

a rotatable member;

an elongated member with at least one ramped surface;

at least one wedge member; wherein the rotatable member interferes with the elongated member so that the elongated member moves linearly relative to the at least one wedge member when the rotatable member is rotated; and wherein the at least one wedge member interferes with the at least one ramped surface as the elongated member moves so that the elongated member is wedged against the at least one wedge member to move the plate.

3. The apparatus of claim 1, wherein the cam mechanism has:

a rotatable member;

an elongated member with an opening extending therethrough;

a ramp member secured to the plate and having a slot extending through the ramp member at an angle with respect to the plate;

a pin secured to the elongated member and extending through the elongated member to traverse the opening and to extend through the ramp member at the slot; wherein the rotatable member interferes with the elongated member so that the elongated member moves linearly relative to the ramp member when the rotatable member is rotated; and wherein the pin interferes with the ramp member at the slot as the elongated member moves so that the ramp member, the plate, and the first engine crankcase member are separated from the second engine crankcase member as the elongated member moves.

4. The apparatus of claim 1, wherein the apparatus has recesses spaced to align with the studs when the studs are connected to the second engine crankcase portion so that the apparatus rests on the studs at the recesses.

5. The apparatus of claim 1, wherein the studs are bolts with threaded portions configured to be threaded to the second crankcase portion.

6. The apparatus of claim 1, wherein the rotatable member is a set screw.

7. An apparatus for separating a first engine crankcase portion from a second engine crankcase portion comprising:

a plate configured for connection to the first engine crankcase portion;

a cam mechanism secured to the plate and having a portion spaced from the plate to define a gap between the portion of the cam mechanism and the plate;

wherein the cam mechanism has:

a rotatable member;

an elongated member with an opening extending therethrough;

a ramp member secured to the plate and having a slot extending through the ramp member at an angle with respect to the plate;

a pin secured to the elongated member and extending through the elongated member to traverse the opening and to extend through the ramp member at the slot; wherein the rotatable member interferes with the elongated member so that the elongated member moves relative to the ramp member when the rotatable member is rotated;

studs configured for connection to the second engine crankcase portion and configured to span the gap when connected to the second engine crankcase portion;

wherein the apparatus has recesses spaced to align with the studs when the studs are connected to the second engine crankcase portion so that the apparatus rests on the studs at the recesses when the plate is connected to the first engine crankcase portion; and wherein the pin interferes with the ramp member at the slot as the elongated member moves so that the ramp member, the plate, and the first engine crankcase member are separated from the second engine crankcase member as the elongated member moves.

* * * * *